(12) United States Patent
Chester

(10) Patent No.: US 8,687,734 B1
(45) Date of Patent: Apr. 1, 2014

(54) NON-CAUSAL ORTHOGONAL FREQUENCY DIVISION MULTIPLEXING TAPERED PEAK SUPPRESSION

(71) Applicant: Harris Corporation, Melbourne, FL (US)

(72) Inventor: David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/733,379

(22) Filed: Jan. 3, 2013

(51) Int. Cl.
*H04L 25/49* (2006.01)
*H04J 11/00* (2006.01)

(52) U.S. Cl.
USPC .......................................... 375/297; 370/208

(58) Field of Classification Search
CPC .............. H04L 1/0041; H04L 27/2614; H04L 27/2618; H04L 27/262; H04L 27/2624; H04L 27/3405; H04B 1/0475; H03F 2201/3224; H03F 2201/3233; H03F 3/24
USPC ................. 375/260, 285, 295, 296, 297, 377; 455/91, 127.1, 127.2, 127.3; 332/106, 332/107, 117, 123, 124, 125; 370/203, 208
See application file for complete search history.

(56) References Cited

U.S. PATENT DOCUMENTS

| | | | |
|---|---|---|---|
| 6,175,551 B1 | 1/2001 | Awater et al. | |
| 6,657,950 B1 | 12/2003 | Jones, IV et al. | |
| 7,664,192 B2 * | 2/2010 | Yun et al. | 375/267 |
| 2004/0218689 A1 * | 11/2004 | Akhtman | 375/296 |
| 2006/0078066 A1 * | 4/2006 | Yun et al. | 375/299 |
| 2007/0121483 A1 * | 5/2007 | Zhang et al. | 370/208 |
| 2011/0122930 A1 * | 5/2011 | Al-Naffouri et al. | 375/219 |
| 2013/0004180 A1 * | 1/2013 | Gupta et al. | 398/115 |

* cited by examiner

*Primary Examiner* — Tesfaldet Bocure
(74) *Attorney, Agent, or Firm* — Fox Rothschild LLP; Robert J. Sacco; Carol E. Thorstad-Forsyth

(57) ABSTRACT

System (200) and methods (800) for reducing a PAPR of an OFDM signal (204). The methods comprise: routing the OFDM signal to first and second signal processing paths (FSPP and SSPP); time delaying the OFDM signal traveling along FSPP (206); and determining whether an instantaneous signal magnitude value of the OFDM signal traveling along SSPP (208) is greater than a threshold value that would force a power amplifier (250) into a non-linear operational region. If it is determined that the instantaneous signal magnitude value is greater than the threshold value, then a magnitude of at least one complex symbol sample of the OFDM signal which has been time delayed is scaled to a level that precludes the power amplifier from entering its non-linear operational region. If it is determined that the instantaneous signal magnitude value is not greater than the threshold value, then the complex symbol sample is output without modification to the magnitude thereof.

20 Claims, 9 Drawing Sheets

NON-CAUSAL ORTHOGONAL FREQUENCY DIVISION MULTIPLEXING TAPERED PEAK SUPPRESSION

STATEMENT OF THE TECHNICAL FIELD

The inventive arrangements relate to systems and methods for Orthogonal Frequency Division Multiplexing ("OFDM"). More particularly, the inventive arrangements concern systems and methods for non-causal OFDM tapered peak suppression.

DESCRIPTION OF THE RELATED ART

Various types of communication systems are known in the art. One example of a conventional communication system is an OFDM communication system. The OFDM communication system is generally configured to encode digital data on multiple orthogonal carriers. In this regard, a serial stream of binary digits is de-multiplexed into "N" parallel streams of binary digits, where "N" is an integer value. Each stream of binary digits is then mapped to a symbol stream using a modulation scheme. The modulation scheme can include, but is not limited to, a Phase Shift Keying ("PSK") scheme or a Quadrature Amplitude Modulation ("QAM") scheme. Notably, the same or different modulation schemes can be used for modulating the "N" parallel streams of binary digits. Subsequently, an Inverse Fast Fourier Transform ("IFFT") is computed on each set of symbols, thereby forming a set of complex time-domain samples. Each set of complex time domain samples is then converted to an analog domain so as to form an analog signal. Thereafter, the analog signals are used to phase modulate the orthogonal carriers. The phase modulated orthogonal carriers are added together to generate an OFDM waveform. The OFDM waveform is very efficient in terms of information density defined as bits per Hertz.

A well known problem with such an OFDM communication system is its high Peak to Average Power Ratio ("PAPR"). As used herein, the term "PAPR" refers to the peak amplitude squared divided by a Root Mean Square ("RMS") value squared. The high PAPR is a direct result of the OFDM waveform being a linear combination of multiple orthogonal carriers being phase modulated by random data streams. With random incidence, the phases of the orthogonal carriers can align to cause various degrees of constructive interference so that the output power can peak with the maximum possible peak being a function of the number of orthogonal carriers as well as various modulation parameters.

Because OFDM is phase modulation based, any Power Amplifier ("PA") following an OFDM waveform generating circuit is required to operate in a linear region. In some scenarios, the "linear region operation" of the PA is achieved by "reducing" an output power of the PA below its maximum possible output level. As a result of such power reduction, the PA operates in the linear region even when the OFDM waveform reaches an extreme peak thereof. Such a solution provides a highly inefficient use of the PA, and a requirement that the PA be oversized. The use of an oversized PA adds inordinate cost to an OFDM transmitter.

In other scenarios, the "linear region operation" of the PA is achieved by using a statistical distribution of the peaking of a given OFDM waveform to determine an output level that can be clipped. Clipping the peak causes signal distortion which results in decision errors at a receiver. The number and characteristics of errors allow the Forward Error Correction ("FEC") codes employed by the OFDM based system to correct decision errors. A problem with this technique is that every time a peak is clipped, the Voltage Standing Wave Ratio ("VSWR") of the output changes drastically, which in turn causes a large amount of power to be reflected back into an output port of the PA. The reflected power causes the operating lifetime of the PA to be drastically reduced. While a Radio Frequency ("RF") circulator can be employed to absorb the reflected power, it adds a large amount of size and cost to the transmitter.

Consequently, many non-clipping solutions have been created for addressing the high PAPR issue. Such conventional non-clipping solutions include a class of baseband solutions. The baseband solutions generally involve randomizing the carrier's relative phases in an a prior defined way which can be reversed at the receiver. The phase randomization adds complexity to the OFDM based system in the following three ways: (1) the randomization of the carriers at the transmitter; (2) the de-randomization process at the receiver; and (3) the requirement to synchronize the randomization and de-randomization processes.

SUMMARY OF THE INVENTION

The invention concerns implementing systems and methods for reducing a PAPR of an OFDM signal. In some scenarios, the OFDM is a baseband OFDM signal. The methods involve: routing the OFDM signal to first and second signal processing paths; time delaying the OFDM signal traveling along the first signal processing path; and determining whether an instantaneous signal magnitude value of the OFDM signal traveling along the second signal processing path is greater than a threshold value that would force a power amplifier into a non-linear region of operation. If it is determined that the instantaneous signal magnitude value is not greater than the threshold value, then a first complex symbol sample of the OFDM signal which has been time delayed is output without modification to the magnitude thereof. If it is determined that the instantaneous signal magnitude value is greater than the threshold value, then a magnitude of the first complex symbol sample is scaled to a level that precludes the power amplifier from entering its non-linear region of operation. The scaling can be performed at baseband or at an intermediate frequency.

In some scenarios, additional scaling operations are performed if it is determined that the instantaneous signal magnitude value is greater than the threshold value. The additional scaling operations generally involve scaling magnitudes of a plurality of second complex symbol samples of the OFDM signal which immediately precede or succeed the first complex symbol sample. The magnitudes of the first and second complex symbol samples are scaled by different amounts so as to prevent large instantaneous amplitude changes of the OFDM signal.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments will now be described with respect to FIGS. 1-5. Embodiments generally relate to implementing systems and methods for reducing the PAPR of an OFDM waveform without any phase distortion and little, infrequent amplitude distortion to each carrier. The statistical frequency of occurrence and level of amplitude distortion can be traded off with the PA "back off" by adjusting a PAPR threshold at which the process is used. Even with drastic reductions in PAPR, the raw (no FEC applied) data error rates increase only slightly. The present technique requires no modification to a standard OFDM receiver.

The present invention is based on the observation that scaling of the magnitude of an OFDM waveform causes no per-carrier phase distortion and the amount of per carrier amplitude distortion is proportional to the number of constituent carriers. Thus, for QAM modulated carriers, during symbol periods when the peak is above a predefined threshold, the phases of each of the transmitted symbols are unaffected while the magnitude of each transmitted symbol is changed by only a small amount. Since the phases are unaffected, amplitude distortion caused by channel effects and distortions in the receiver chain will only increase error rates due to amplitude reduced distances to constellation decision thresholds.

Figure 1:
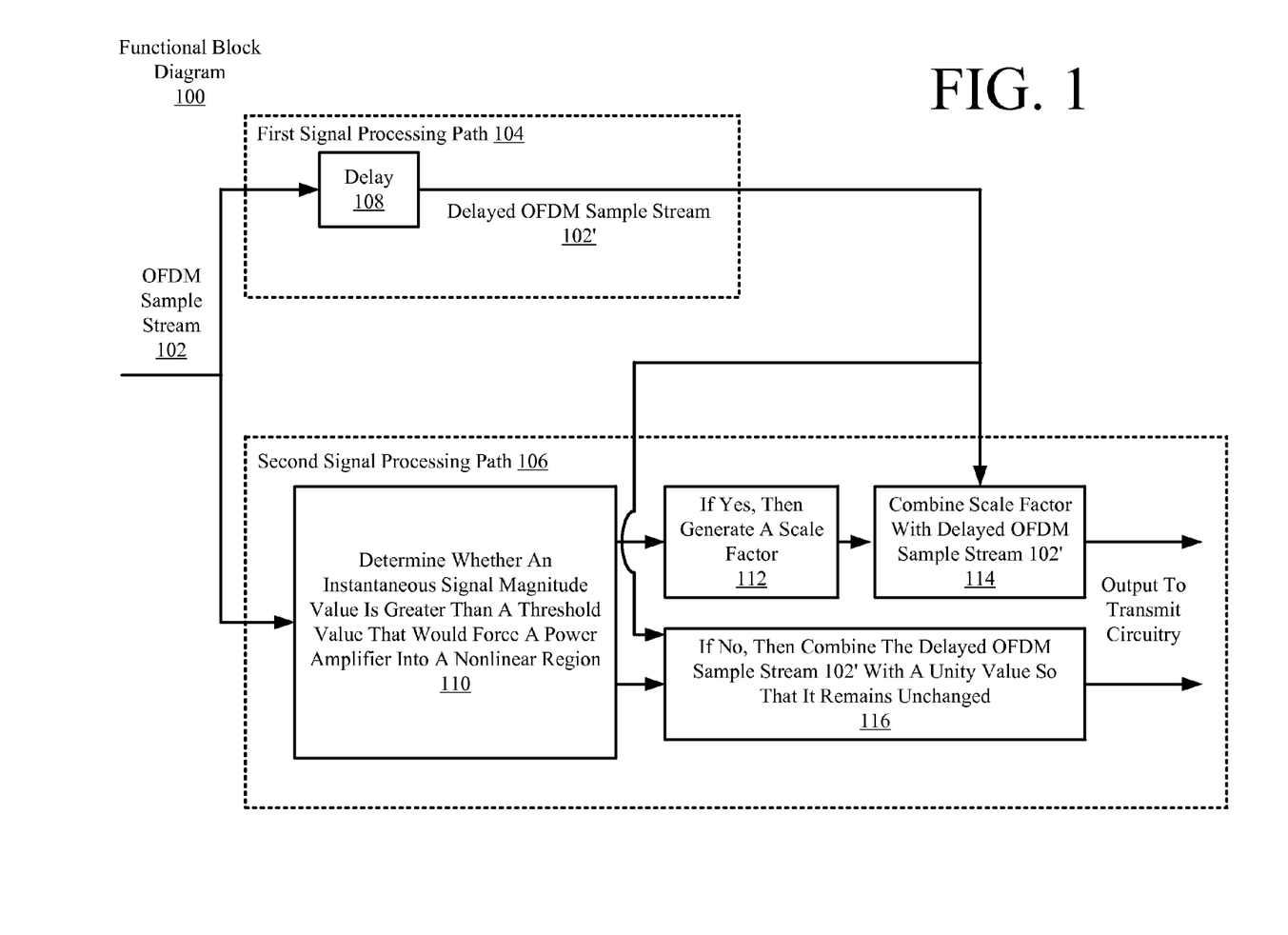
FIG. 1 is a functional block diagram illustrating basic concepts of the present invention.

The basic concept of the present invention is schematically illustrated by a functional block diagram 100 provided in FIG. 1. As shown in FIG. 1, a baseband OFDM sample stream 102 is routed to two signal processing paths 104, 106. Within the first signal processing path 104, the baseband OFDM sample stream 102 is time delayed as shown by functional block 108. The baseband OFDM sample stream 102 is time delayed to allow modifications thereto prior to transmission thereof from a transmitter. The time delayed version of signal 102 is referred to herein as "the delayed baseband OFDM sample stream 102'". The modifications are made contingent on a determination that the baseband OFDM sample stream 102 requires modification for ensuring that a PA will operate in its linear region.

Within the second processing path 106, a determination is made in functional block 110 as to whether an instantaneous signal magnitude value of the baseband OFDM sample stream 102 is greater than a threshold value that would force a PA into a non-linear region of operation. Various methods of computing the threshold value will be described in detail below.

If the condition is detected, then a scale factor is generated in functional block 112. Thereafter, the magnitude of at least one complex symbol sample of the delayed baseband OFDM sample stream 102' is scaled to a level that precludes the PA from entering its non-linear operating region, as shown by functional block 114. Such a level can include, but is not limited to, any level below that represented by the threshold value.

If the condition is not met, then the delayed baseband OFDM sample stream 102' is combined with a unity value as shown by functional block 116. Such a combining operation, results in no modification to the magnitude of the complex symbol sample of the delayed baseband OFDM sample stream 102'. The results of the operations performed in functional blocks 114, 116 are then output to transmit circuitry. The transmit circuitry can include, but is not limited to, a PA.

The basic concepts of the present invention are not limited to that of functional block diagram 100. For example, functional block diagram 100 can be modified to include a selection operation or a bypass operation, as opposed to the combining operations of functional block 116. In the selection scenario, the output of functional block 108 or functional block 114 would be selected based on the results of the determination made in functional block 110. In the bypass scenario, the scaling operations of functional blocks 112, 114 would be bypassed if the instantaneous signal magnitude is not greater than the threshold value, such that the delayed baseband OFDM sample stream 102' is output to transmit circuitry without any modification to a magnitude thereof.

There are many ways to implement the above described concepts of the present invention in software and/or hardware. Representative examples of how to implement these concepts in software and/or hardware are described below in relation to FIGS. 2-7. A key desirable feature of the scaling technique is that it doesn't cause an undesirable amount of spectral re-growth resulting from an instantaneous change in the waveform. In most cases, when the scaling is done at baseband with a low number of samples per symbol period, it can usually be assured that the subsequent filtering in the signal processing chain will "smooth" the OFDM waveform enough that, coupled with the infrequent and short durations of the modifications, the transmitted signal will still meet required spectral masks. If the implementation performs the modification at an Intermediate Frequency ("IF") where the sample rates are higher and there is less subsequent filtering, the scaling is equivalent to applying a rectangular window with its corresponding frequency domain distortion. In these cases, an a priori determined tapered window scaled by the magnitude correction is applied to the attack and decline of the symbol duration to limit the frequency domain distortion to an acceptable shape.

Figure 2:
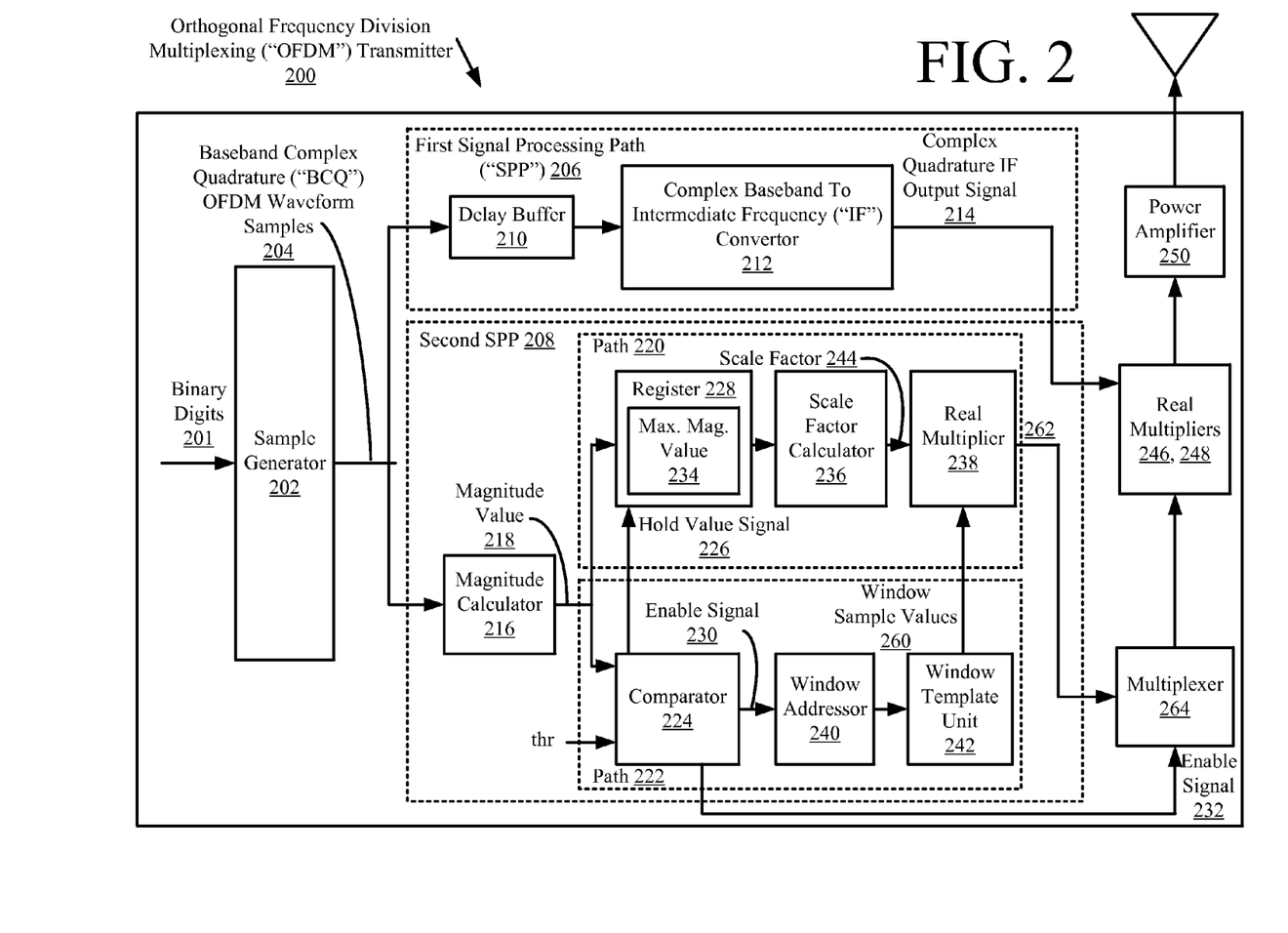
FIG. 2 is a bock diagram of an exemplary OFDM transmitter.

Referring now to FIG. 2, there is provided a schematic illustration of an exemplary OFDM transmitter 200 that is useful for understanding the present invention. The OFDM transmitter 200 can include more or less components than that shown in FIG. 2. For example, the OFDM transmitter 200 can include a complex to quadrature IF to RF converter (not shown) prior to a power amplifier, as well as other transmit circuitry. Such components are not shown for purposes of clarity, simplicity and ease of explanation.

The OFDM transmitter 200 comprises an electronic circuit configured to implement the present invention. In this regard, a sample generator 202 is provided in the OFDM transmitter 200. The sample generator 202 is generally configured to generate Baseband Complex Quadrature ("BCQ") OFDM waveform samples 204 using binary digits 201. Techniques for generating such BCQ OFDM waveform samples are well known in the art, and therefore will not be described herein; any known or to be known technique can be used herein without limitation. In some scenarios, the BCQ OFDM waveform samples 204 are generated by: de-multiplexing a serial stream of binary digits into a plurality of parallel streams of binary digits; mapping each stream of binary digits to a symbol stream using a modulation scheme (e.g., a PSK scheme or a QAM scheme); and computing an IFFT on each set of symbols to form a set of BCQ OFDM waveform samples 204.

The BCQ OFDM waveform samples 204 are routed to two Signal Processing Paths ("SPPs") 206, 208. A first SPP 206 comprises a delay buffer 210 and a Complex Baseband to Intermediate Frequency ("CB-to-IF") convertor 212. The delay buffer 210 delays the BCQ OFDM waveform samples 204 long enough for the second SPP 208 to determine which samples require scaling to keep a PA 250 in its linear operating region. Because of the delay in the first SPP 206, the detection in the second SPP 208 occurs before the detected phenomena happens which makes it non-causal or acausal. As known in the art, a causal system is a system with output and internal states that depends only on the current and previous input values. A system that has some dependence on input values from the future, in addition to possible past or current input values, is termed an acausal system. A system that depends solely on future input values is an anti-causal system. Acausal filters, for example, can only exist as post-processing filters, because there filters can extract future values from a memory buffer or a file.

The CB-to-IF convertor 212 is configured to interpolate the BCQ OFDM waveform samples 204 to a sample rate consistent with an IF carrier, and quadrature up-convert the carrier to IF. The output of the CB-to-IF convertor 212 is referred to herein as a complex IF output signal 214. Because of the interpolation, the number of samples per symbol time is greatly increased. The complex IF output signal 214 is then passed to real multipliers 246, 248. The real multipliers 246, 248 multiply real components and imaginary components of the complex IF output signal 214 by identical quantities on a per sample basis.

The second SPP 208 comprises a magnitude calculator 216. The magnitude calculator 216 is configured to calculate the magnitude or the magnitude squared of each BCQ OFDM waveform sample 204. As should be appreciated, a magnitude squared computation is less complex than a magnitude computation since it does not require a square root operation. Subsequent operations in the second SPP 208 are modified to be consistent with whether the magnitude or magnitude squared is calculated. The magnitude value 218 output from the magnitude calculator 216 is then passed to two paths 220, 222.

In path 222, the magnitude value 218 is compared to an absolute threshold value thr of the maximum allowable output. If the magnitude value 218 is greater than the absolute threshold value thr, then the following operations are performed:

(1) setting a hold value signal 226 for a duration of a current symbol period;
(2) disabling the comparison operations of comparator 224 for a duration of the current symbol period;
(3) optionally determining a location of the maximum magnitude value 234 above the absolute threshold value thr in a symbol duration, or predicting said location based on a heuristically modified detected first magnitude value;
(4) registering the maximum magnitude value 234 in a register 228;
(5) providing an enable signal 230, from the comparator 224 to a window addresser 240, that has an appropriate time delay ($\tau_1$) for initiating an application of a predetermined window; and
(6) providing an enable signal 232, from the comparator 224 to a multiplexer 264, with the appropriate time delay ($\tau_2$) for initiating an application of a windowed scaling to real multipliers 246, 248.

Upon completing some or all of the above listed operations (1)-(6), the registered maximum magnitude value 234 is used by a scale factor calculator 236 to calculate a scale factor 244. The scale factor 244 has a value for ensuring that symbol samples, having a magnitude less than or equal to a maximum allowable magnitude value, will not be supplied to the PA 250 by real multipliers 246, 248. The scale factor 244 is then passed to a real multiplier 238.

At real multiplier 238, the scale factor 244 is multiplied by window sample values 260. The result of this multiplication operation is referred to herein as a scaled window sample value 262. The window sample value 260 is generated by a window template unit 242 for the duration of a symbol. The scaled window sample value 262 ensures that the PA 250 will not enter into its non-linear region by preventing large instantaneous amplitude steps which cause spectral distortion.

The window addressor 240 is configured to act as a counter. The window addressor 240 is initialized synchronously with the start of a symbol time. The window addressor 240 sequences through a window assuring that a magnitude of each output sample of a symbol is scaled by the proper window value. The window addressor 240 and window template unit 242 are clocked consistent with an IF sample rate.

The scaled window sample value 262 is then communicated from the real multiplier 238 to a multiplexer 264. The multiplexer 264 routes the scaled window sample value 262 to the real multipliers 246, 248 if the absolute threshold value thr is surpassed by the magnitude value 218. At the real multipliers 246 and 248, a respective sample of the complex IF output signal 214 is multiplied by the scaled window sample value 262 so that the magnitude thereof is changed. If the absolute threshold value thr is not surpassed by the magnitude value 218, then the respective sample of the complex IF output signal 214 is multiplied by unity so that the magnitude value thereof remains unchanged.

Figure 3:
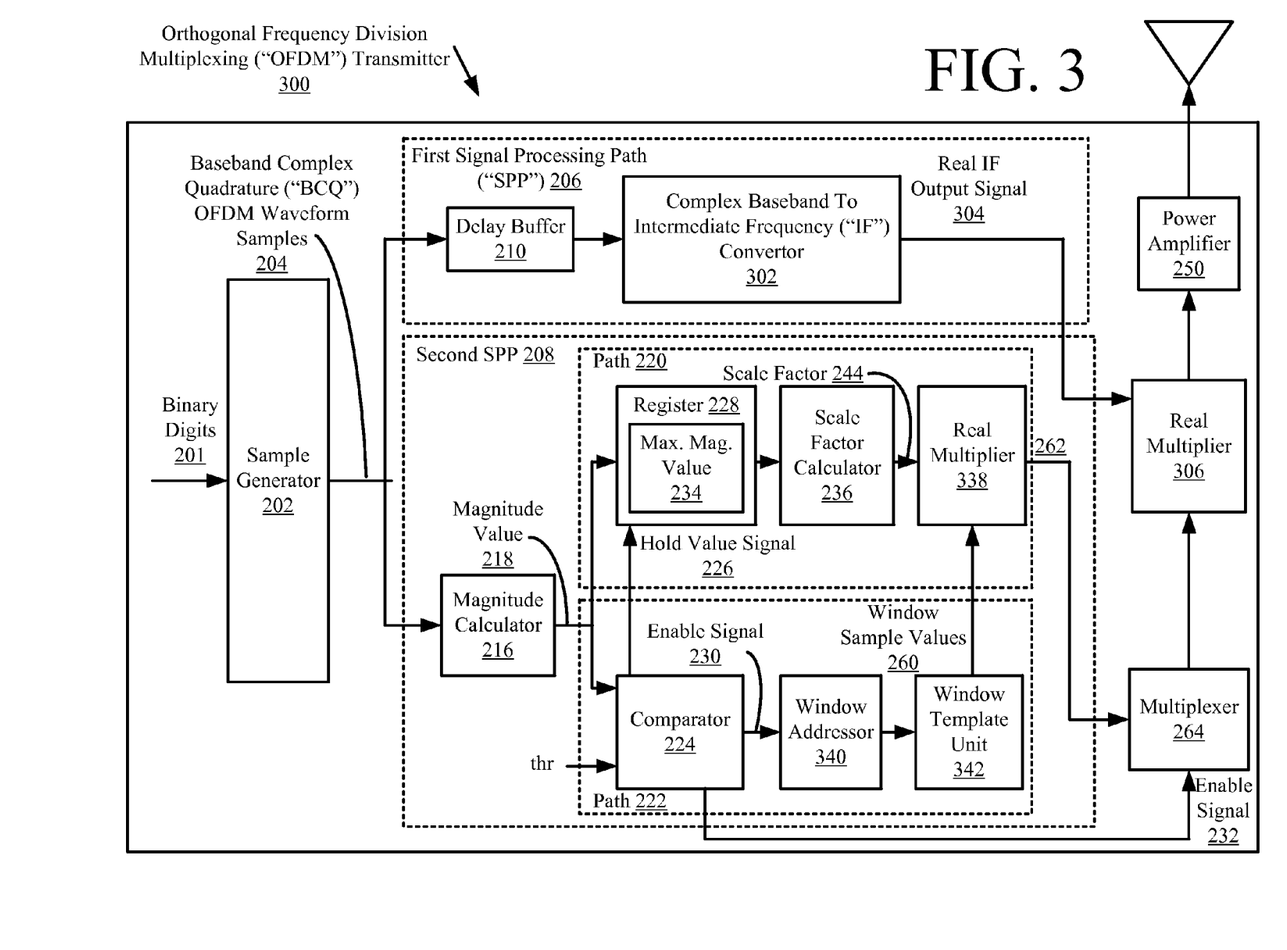
FIG. 3 is a block diagram of another exemplary OFDM transmitter.

Referring now to FIG. 3, there is provided another exemplary OFDM transmitter 300 that is useful for understanding the present invention. The OFDM transmitter 300 is similar to the OFDM transmitter 200 described above in relation to FIG. 2, except for the fact that a CB-to-IF convertor 302 has a real IF output signal 304. As a result, the sample rate of the real IF output signal 304 is at least twice that of a complex IF signal at the same carrier frequency. While only a single real multiplier 306 is required to scale the samples of the real IF output signal 304, the real multiplier 306 must run at twice the speed of the two real multipliers 246, 248 of FIG. 2. The rates of the window template unit 342 and the window addressor 340 are required to be commensurate with the real multiplier 306. Also, since there are at least twice as many real samples per symbol time at the IF sample rate, the window template unit 342 generates twice the number of samples for a symbol as the window template unit 242 of FIG. 2. The real multiplier 338 operates at twice the speed as the real multiplier 238 of FIG. 2.

Figure 4:
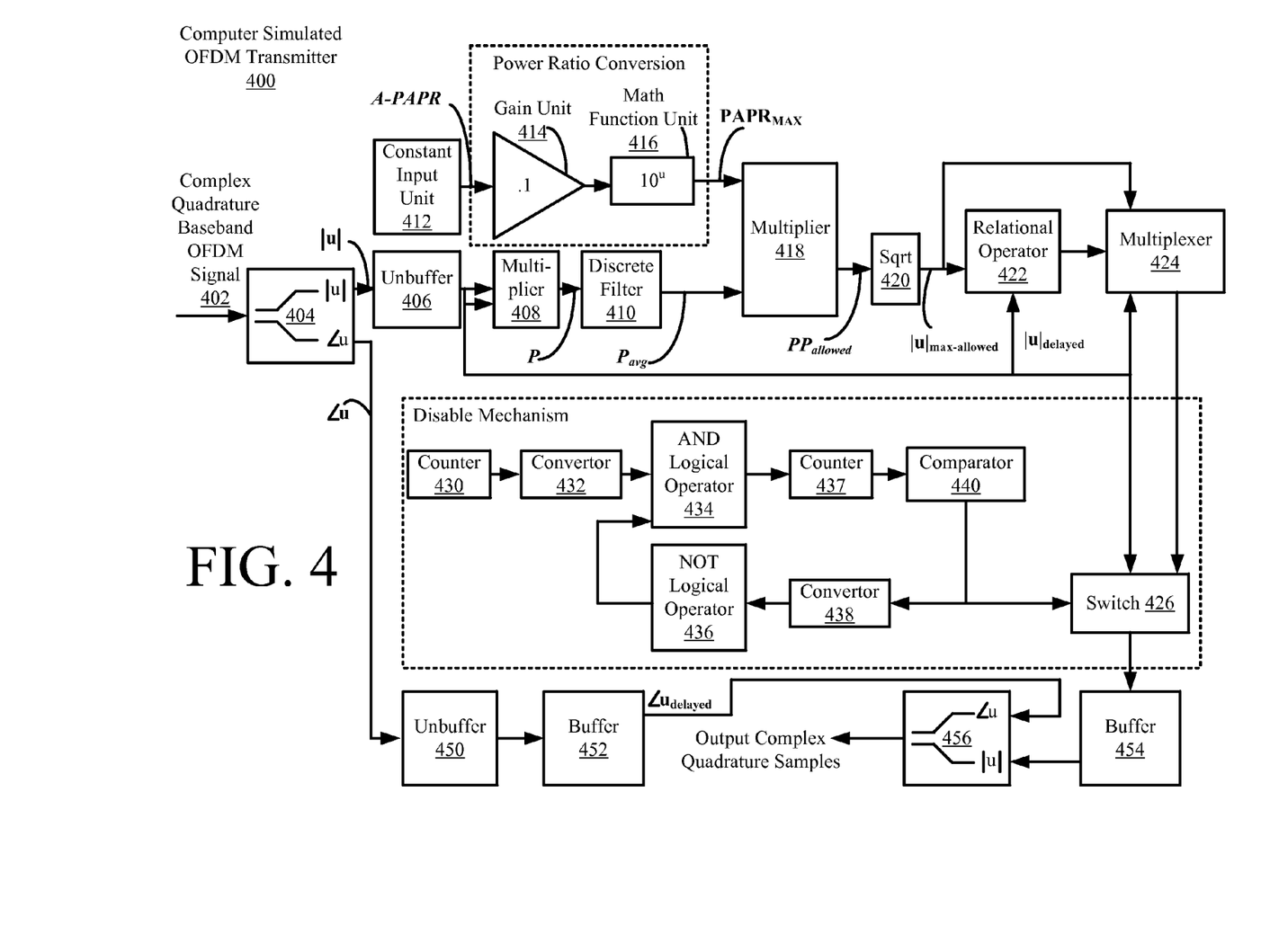
FIG. 4 is a computer simulated OFDM transmitter.

Referring now to FIG. 4, there is provided a computer simulated OFDM transmitter 400 that is useful for understanding the present invention. A higher level functional block diagram 500 of the operations performed by OFDM transmitter 400 is provided in FIG. 5. Accordingly, the OFDM transmitter 400 will be described in relation to both FIG. 4 and FIG. 5. Although the OFDM transmitter 400 is a computer simulated transmitter implemented in software, the present invention is not limited in this regard. The operations of OFDM transmitter 400 can be implemented in software, hardware via an electronic circuit, or a combination of both.

The unbuffer blocks 406, 450 and buffer blocks 452, 454 are functions of the software program (e.g., SIMULINK), employed for creating the computer simulated OFDM transmitter 400, to speed up verification. As such, these blocks 406, 450, 452, 454 do not have a counterpart in FIG. 5. At this level in the software program, all operations are synchronized and delays are calculated and compensated for automatically at lower levels. Thus, the delay buffers 516, 524 of FIG. 5 have no counterparts in FIG. 4.

Figure 5:
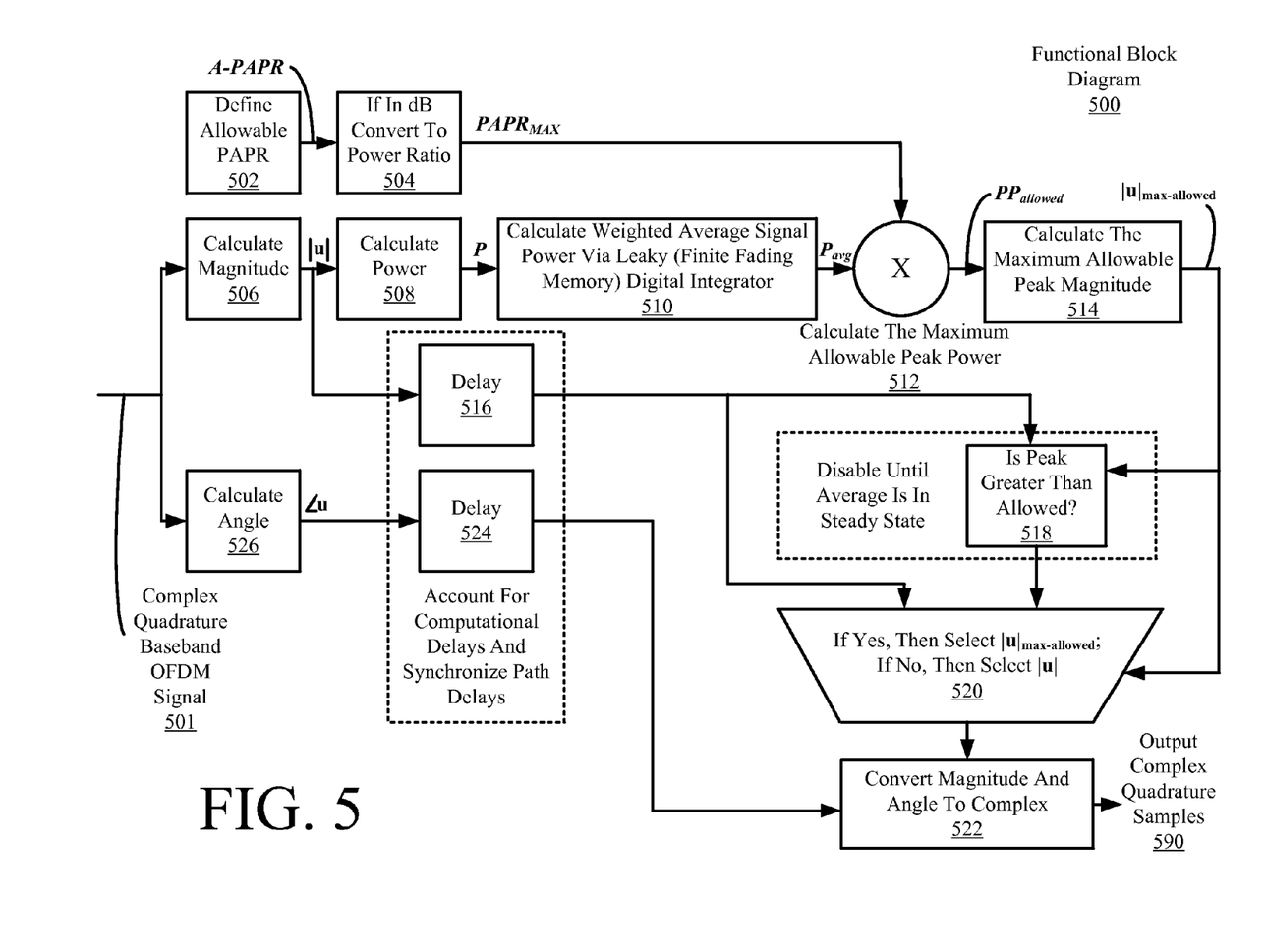
FIG. 5 is a functional block diagram of operations performed by the computer simulated OFDM transmitter of FIG. 4.

Functional block 502 of FIG. 5 corresponds to components 412-416 of FIG. 4. In functional block 502, a maximum peak to average power ratio PAPR$_{MAX}$ is defined. Unlike the two previously described OFDM transmitters 200, 300 in which a maximum peak value is defined, the allowable peak to average power ratio A-PAPR is an input parameter in OFDM transmitter 400. Therefore, if the allowable peak to average power ratio A-PAPR is supplied in a standard decibel ("dB") power format, then it is converted into the maximum peak to average power ratio PAPR$_{MAX}$, as shown by components 414, 416 of FIG. 4 and functional block 504 of FIG. 5. The maximum peak to average power ratio PAPR$_{MAX}$ can be defined by the following mathematical equation (1), which is implemented by components 414, 416 of FIG. 4.

$$PAPR_{MAX}=10^{(A\text{-}PAPR\ in\ dB)/10} \tag{1}$$

As shown in FIGS. 4-5, a complex quadrature baseband OFDM signal 402, 501 is used to calculate an instantaneous signal magnitude value |u| and an instantaneous signal phase value ∠u for each symbol sample thereof. These computations are performed by magnitude/phase computation unit 404 of FIG. 4 and in functional blocks 506, 526 of FIG. 5. The magnitude value |u| is then used to compute a power value P. The power computation can be defined by the following mathematical equation (2), which is implemented by component 408 of FIG. 4 and functional block 508 of FIG. 5.

$$P=|u|^2 \tag{2}$$

Thereafter, the power value P is used to calculate an average signal power value P$_{avg}$. This computation is performed by discrete filter 410 of FIG. 4 and in functional block 510 of FIG. 5. There are many known ways of computing an average signal power value P$_{avg}$. For example, the average signal power P$_{avg}$ can be computed by: ensembling moving averages using a Hogenauer filter structure; computing a weighted average; or computing a finite fading memory average. In FIGS. 4-5, the average signal power value P$_{avg}$ is computed using a leaky digital integrator. Leaky digital integrators are well known in the art, and therefore will not be described herein. Still, it should be understood that the leaky digital integrator has an input gain of alpha α and a feedback gain of one minus alpha 1-α. Embodiments are not limited in this regard. Any known or to be known method for computing an average signal power value P$_{avg}$ can be used herein without limitation.

The average signal power value P$_{avg}$ is then used to compute the allowed peak power PP$_{allowed}$, as shown by functional block 512 of FIG. 5. The operations for computing the allowed peak power PP$_{allowed}$ can be defined by the following mathematical equation (3), which is implemented by multiplier 418 of FIG. 4.

$$PP_{allowed}=P_{avg}\cdot PAPR_{MAX} \tag{3}$$

A square root of the allowed peak power PP$_{allowed}$ is then calculated to yield a maximum allowable signal magnitude |u|$_{max\text{-}allowed}$, as shown by math function unit 420 of FIG. 4 and functional block 514 of FIG. 5.

Subsequent to computing the maximum allowable signal magnitude |u|$_{max\text{-}allowed}$, comparison operations may be performed as shown by functional block 518 of FIG. 5. The comparison operations are performed to detect when a delayed magnitude value |u|$_{delayed}$ is greater than the maximum allowable signal magnitude |u|$_{max\text{-}allowed}$. Notably, the comparison operations are disabled until the leaky digital integrator enters a steady state of behavior to prevent false alarm detection of peaks above the allowed value. Stated differently, the comparison operations are exclusively performed when the digital filer or leaky digital integrator has a steady state behavior. Steady state behavior of digital filters is well known in the art, and therefore will not be described herein. The comparison operations are implemented by relational operator 422 of FIG. 4. The disable operations are implemented by components 426 and 430-440 of FIG. 4.

If the delayed magnitude value $|u|_{delayed}$ is greater than the maximum allowable signal magnitude $|u|_{max-allowed}$, then the maximum allowable signal magnitude $|u|_{allowed}$ is selected for further processing, as shown by functional block 520 of FIG. 5. If the delayed magnitude value $|u|_{delayed}$ is less than or equal to the maximum allowable signal magnitude $|u|_{max-allowed}$, then the delayed magnitude value $|u|_{delayed}$ is selected for further processing, as also shown by functional block 520 of FIG. 5. The selection operations are implemented by multiplexer 424 of FIG. 4.

After completing the selection operations of functional block 520 of FIG. 5, operations are performed to: (a) align phase samples with corresponding processed magnitude samples; and (b) convert a delayed phase value $\angle u_{delayed}$ and the selected magnitude value $|u|_{delayed}$ or $|u|_{max-allowed}$ into output complex quadrature samples 590, as shown by functional block 522 of FIG. 5. Operations (a) and (b) are implemented by computation unit 456 of FIG. 4.

Unlike the IF implementations described above in relation to FIGS. 2-3, the baseband implementations of FIGS. 4-5 operate only on a low sample per symbol count. Subsequent filtering in the signal processing chain usually reduces the spectral spreading caused by a magnitude adjustment to preclude a necessity of explicit time domain windowing. When this is not the case, baseband windowing can be applied as the lower sample rate analog to IF windowing described above.

Also, when operating on a baseband signal, it is unusual once the delayed magnitude $|u|_{delayed}$ reaches the maximum allowable signal magnitude $|u|_{max-allowed}$ that the baseband signal 402, 501 will subside during a symbol time. Further, even if the baseband signal 402, 501 does subside during the symbol time, a subsequent filtering will smooth out any rapid changes in the magnitude $|u|$ during the symbol time. When there is no explicit windowing applied, there is likely no need to register a threshold crossing signal for a symbol duration. However, there may be some instances when no explicit window is applied and a requirement exists to hold the threshold crossing signal once it is set for the duration of the symbol time. If an explicit window is implemented at baseband, a hold circuit may be implemented in baseband instantiations. The hold circuit can be the same as or similar to that described above in relation to FIGS. 2-3. For example, the hold circuit can include, but is not limited to, components similar to or the same as components 224-228 of FIGS. 2-3.

Figure 6:
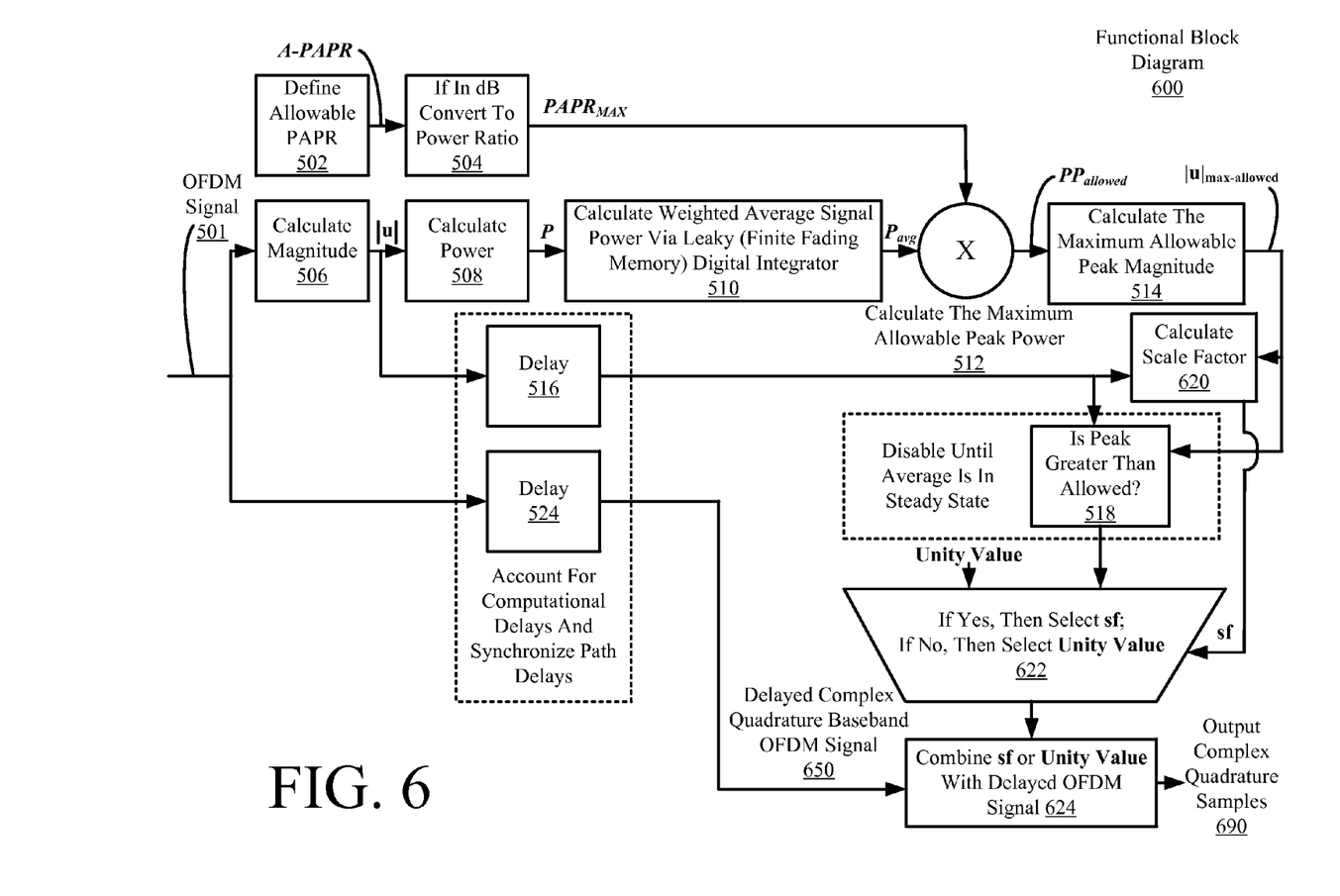
FIGS. 6-7 each provide a functional block diagram of operations performed by another exemplary OFDM transmitter.

Referring now to FIG. 6, there is provided a functional block diagram 600 of operations performed by another exemplary OFDM transmitter. The functions of functional block diagram 600 can be implemented in software, hardware, or a combination of both hardware and software. Functional block diagram 600 is similar to functional block diagram 500 described above. However, the technique employed in functional block diagram 600 to scale a baseband output is different than that used in functional block diagram 500. As described above in relation to FIG. 5, an output complex quadrature sample 590 is generated by: calculating a phase value $\angle u$ of an OFDM sample; delaying the phase value $\angle u$; and combining the delayed phase value $\angle u_{delayed}$ with a selected magnitude value $|u|_{delayed}$ or $|u|_{max-allowed}$. In contrast, an output complex quadrature sample 690 is generated in functional block diagram 600 by delaying a complex quadrature baseband OFDM signal to align it with a magnitude modification result, similar to the IF instantiations.

If the delayed magnitude value $|u|_{delayed}$ is greater than the maximum allowable signal magnitude $|u|_{max-allowed}$, then a scale factor sf generated in functional block 620 is selected, as shown by functional block 622. The scale factor sf can be defined by the following mathematical equation (4).

$$sf=|u|_{max-allowed}/|u|_{delayed} \qquad (4)$$

The scale factor sf is then combined with a delayed complex quadrature baseband OFDM signal 650, as shown by functional block 624. This combining can be achieved using two real multipliers. As a result of the combining, a magnitude of the delayed complex quadrature baseband OFDM signal 650 is changed to the maximum allowable signal magnitude $|u|_{max-allowed}$ value.

If the delayed magnitude value $|u|_{delayed}$ is less than or equal to the maximum allowable signal magnitude $|u|_{max-allowed}$, then a unity value is selected, as shown by functional block 622. The unity value is then combined with the delayed complex quadrature baseband OFDM signal 650, as shown by function block 624. This combining can be achieved using two real multipliers. As a result of the combining, a magnitude of the delayed complex quadrature baseband OFDM signal 650 is unchanged.

Figure 7:
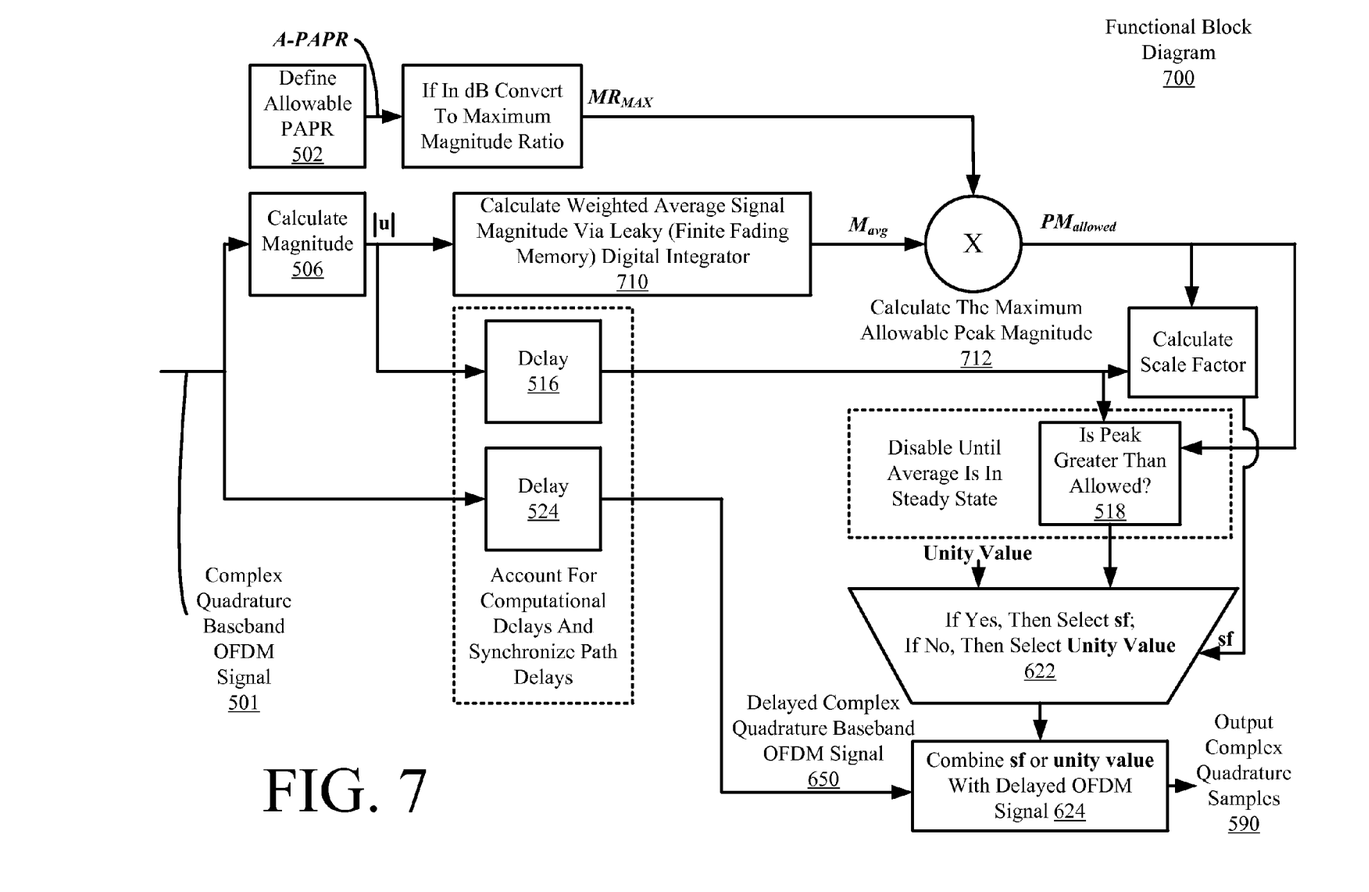

Referring now to FIG. 7, there is provided a functional block diagram 700 of operations performed by another exemplary OFDM transmitter. The functions of functional block diagram 700 can be implemented in software, hardware, or a combination of both hardware and software. Functional block diagram 700 is similar to functional block diagram 600 described above. However, in functional block diagram 700, the magnitude $|u|$ is modified to average magnitudes $M_{avg}$ with the same characteristics (e.g., impulse duration, etc.) instead of average power $P_{avg}$, as shown by functional block 710. Therefore, the components which calculate power from magnitude and magnitude from power are eliminated.

Figure 8:
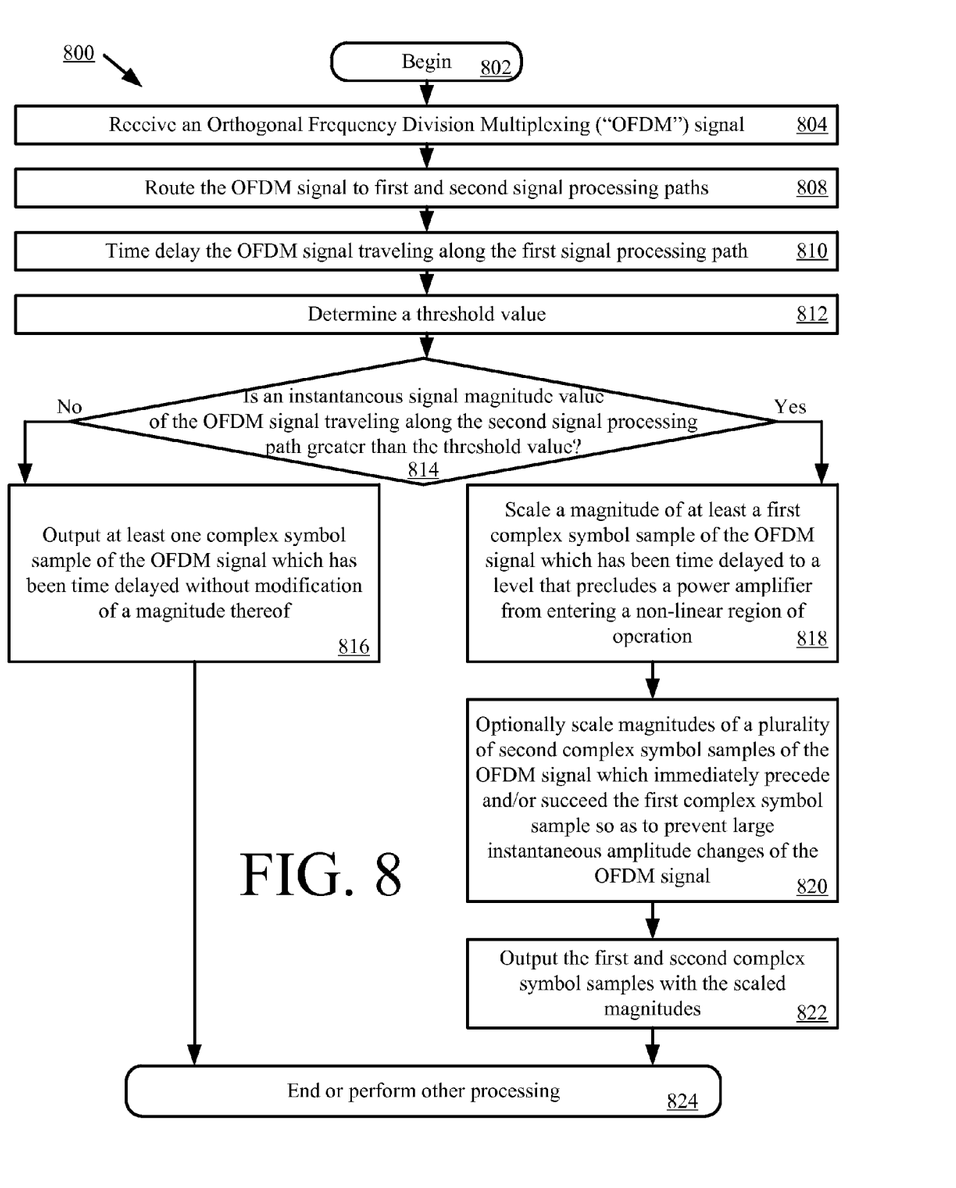
FIG. 8 is a flow diagram of an exemplary method for reducing a PAPR of an OFDM signal.

Referring now to FIG. 8, there is provided a flow diagram of an exemplary method 800 for reducing a PAPR of an OFDM signal. As shown in FIG. 8, method 800 begins with step 802 and continues to step 804. In step 804, the OFDM is received. The OFDM signal is then routed to first and second signal processing paths, as shown by step 808. In a next step 810, the OFDM signal traveling along the first signal processing path is time delayed.

Figure 9:
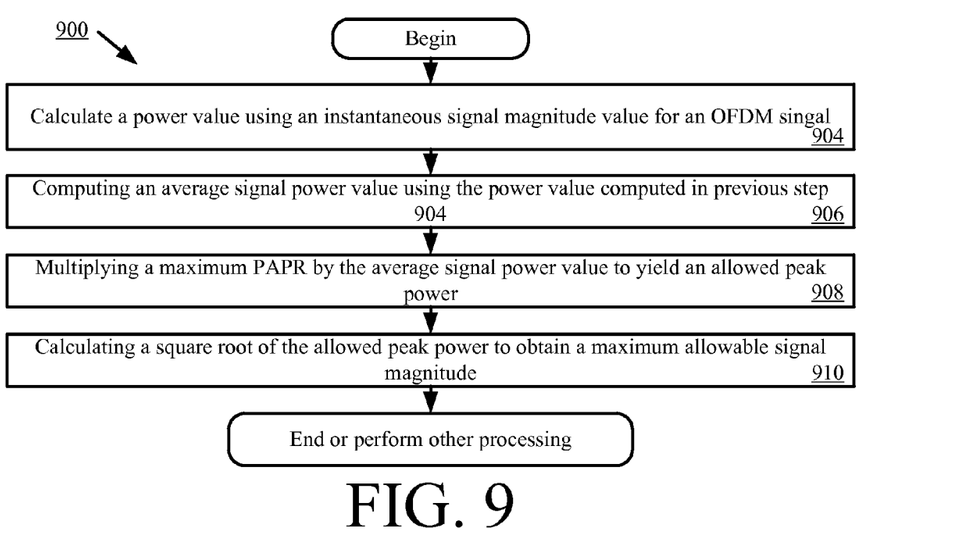
FIGS. 9-10 each provide a flow diagram of exemplary methods for determining a threshold value.
Figure 10:
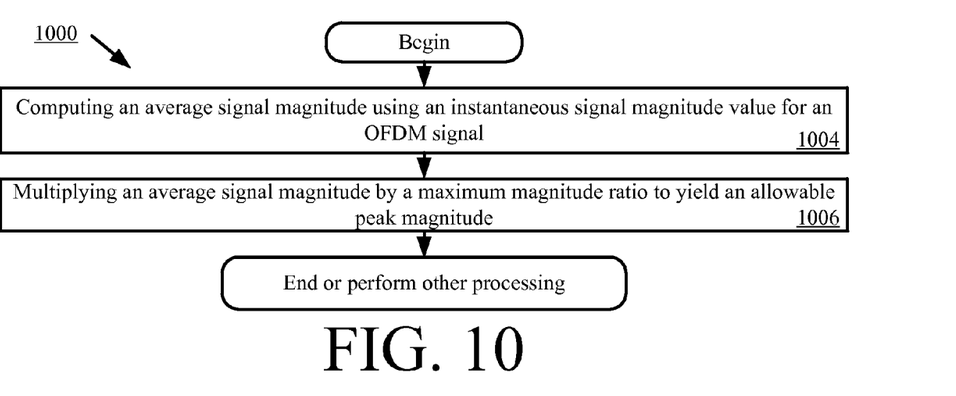

In the second signal processing path comparison operations are performed using a threshold value. The threshold value is determined in step 812. Exemplary methods 900, 1000 for determining the threshold value are schematically illustrated in FIGS. 9-10. As shown in FIG. 9, the threshold value can be determined by: (step 904) calculating a power value using an instantaneous signal magnitude value of the OFDM signal; (step 906) computing an average signal power value using the pre-computed power value; (step 908) multiplying a maximum PAPR by the average signal power value to yield an allowable peak power; and (step 910) calculating a square root of the allowed peak power to obtain a maximum allowable signal magnitude. In this scenario, the maximum allowable signal magnitude comprises the threshold value. As shown in FIG. 10, the threshold value can be determined by: (step 1004) computing an average signal magnitude using an instantaneous signal magnitude value for an OFDM signal; and (step 1006) multiplying an average signal magnitude by a maximum magnitude ratio to yield an allowable peak magnitude. In this scenario, the allowable peak magnitude is used as the threshold value.

Referring again to FIG. 8, the method 800 continues with a decision step 814. In step 814, it is determined whether the instantaneous signal magnitude value of the OFDM signal traveling along the second signal processing path is greater than the threshold value. If the instantaneous signal magnitude value of the OFDM signal traveling along the second signal processing path is not greater than the threshold value [814: NO], then step 816 is performed where at least one complex symbol sample of the OFDM signal which has been time delayed without modification of a magnitude thereof. Subsequently, the method 800 ends or other processing is performed, as shown by step 824. The other processing can include, but is not limited to, processing for transmitting the OFDM signal. For example, the output complex symbol sample can be subsequently processed by an IF to RF conversion chain and/or a power amplifier.

If the instantaneous signal magnitude value of the OFDM signal traveling along the second signal processing path is greater than the threshold value [814: YES], then steps 818-822 are performed. Step 818 involves scaling a magnitude of at least a first complex symbol sample of the OFDM signal which has been time delayed to a level that precludes a power amplifier from entering a non-linear region of operation. Optional step 820 involves scaling magnitudes of a plurality of second complex symbol samples of the OFDM signal which immediately precede and/or succeed the first complex symbol sample so as to prevent large instantaneous amplitude changes of the OFDM signal. Thereafter, the first and second complex symbol samples with the scaled magnitudes are output. Subsequently, the method 800 ends or other processing is performed, as shown by step 824. The other processing can include, but is not limited to, processing for transmitting the OFDM signal. For example, the first and second output complex symbol samples can be subsequently processed by an IF to RF conversion chain and/or a power amplifier.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

I claim:

1. A method for reducing a Peak to Average Power Ratio ("PAPR") of an Orthogonal Frequency Division Multiplexing ("OFDM") signal, comprising:
routing said OFDM signal to first and second signal processing paths;
time delaying said OFDM signal traveling along said first signal processing path;
using a digital filter and said OFDM signal to determine a threshold value;
determining whether an instantaneous signal magnitude value of said OFDM signal traveling along said second signal processing path is greater than said threshold value, exclusively when said digital filter has a steady state behavior;
if it is determined that said instantaneous signal magnitude value is greater than said threshold value, scaling a magnitude of at least a first complex symbol sample of said OFDM signal which has been time delayed to a level that precludes a power amplifier from entering a non-linear region of operation; and
if it is determined that said instantaneous signal magnitude value is not greater than said threshold value, outputting said complex symbol sample of said OFDM signal which has been time delayed without modification to said magnitude thereof.

2. The method according to claim 1, wherein said OFDM signal is a baseband OFDM signal and said scaling is performed at baseband.

3. The method according to claim 1, wherein said OFDM signal is a baseband OFDM signal and said scaling is performed at an intermediate frequency.

4. The method according to claim 1, further comprising scaling magnitudes of a plurality of second complex symbol samples of said OFDM signal which immediately precede or succeed said first complex symbol sample.

5. The method according to claim 4, wherein said magnitudes of said first and second complex symbol samples are scaled by different amounts.

6. A method for reducing a Peak to Average Power Ratio ("PAPR") of an Orthogonal Frequency Division Multiplexing ("OFDM") signal, comprising:
routing said OFDM signal to first and second signal processing paths;
time delaying said OFDM signal traveling along said first signal processing path;
determining whether an instantaneous signal magnitude value of said OFDM signal traveling along said second signal processing path is greater than a threshold value;
if it is determined that said instantaneous signal magnitude value is greater than said threshold value, scaling a magnitude of at least a first complex symbol sample of said OFDM signal which has been time delayed to a level that precludes a power amplifier from entering a non-linear region of operation;
if it is determined that said instantaneous signal magnitude value is not greater than said threshold value, outputting said complex symbol sample of said OFDM signal which has been time delayed without modification to said magnitude thereof; and
determining said threshold value by:
calculating a power value using said instantaneous signal magnitude value;
computing an average signal power value using said power value;
multiplying a maximum PAPR by said average signal power value to yield an allowed peak power; and
calculating a square root of said allowed peak power to obtain a maximum allowable signal magnitude, where said maximum allowable signal magnitude comprises said threshold value.

7. The method according to claim 6, wherein said average signal power value is computed using a digital filter.

8. The method according to claim 7, wherein said determining step is performed exclusively when said digital filter has a steady state behavior.

9. A method for reducing a Peak to Average Power Ratio ("PAPR") of an Orthogonal Frequency Division Multiplexing ("OFDM") signal, comprising:
routing said OFDM signal to first and second signal processing paths;
time delaying said OFDM signal traveling along said first signal processing path;
determining whether an instantaneous signal magnitude value of said OFDM signal traveling along said second signal processing path is greater than a threshold value;
if it is determined that said instantaneous signal magnitude value is greater than said threshold value, scaling a magnitude of at least a first complex symbol sample of said OFDM signal which has been time delayed to a level that precludes a power amplifier from entering a non-linear region of operation;

if it is determined that said instantaneous signal magnitude value is not greater than said threshold value, outputting said complex symbol sample of said OFDM signal which has been time delayed without modification to said magnitude thereof; and determining said threshold value by:
- computing an average signal magnitude using said instantaneous signal magnitude value;
- multiplying said average signal magnitude by a maximum magnitude ratio to yield an allowable peak magnitude, where said allowable peak magnitude comprises said threshold value.

10. The method according to claim 9, wherein said average signal magnitude is computed using a digital filter.

11. The method according to claim 10, wherein said determining step is performed exclusively when said digital filter has a steady state behavior.

12. A system, comprising:
at least one electronic circuit configured to:
- route an OFDM signal to first and second signal processing paths;
- time delay said OFDM signal traveling along said first signal processing path;
- using a digital filter and said OFDM signal to determine a threshold value;
- determine whether an instantaneous signal magnitude value of said OFDM signal traveling along said second signal processing path is greater than said threshold value, exclusively when said digital filter has a steady state behavior;
- if it is determined that said instantaneous signal magnitude value is greater than said threshold value, scale a magnitude of at least a first complex symbol sample of said OFDM signal which has been time delayed to a level that precludes a power amplifier from entering a non-linear region of operation; and
- if it is determined that said instantaneous signal magnitude value is not greater than said threshold value, output said complex symbol sample of said OFDM signal which has been time delayed without modification to said magnitude thereof.

13. The system according to claim 12, wherein said OFDM signal is a baseband OFDM signal and said scaling is performed at baseband.

14. The system according to claim 12, wherein said OFDM signal is a baseband OFDM signal and said scaling is performed at an intermediate frequency.

15. The system according to claim 12, wherein the electronic circuit is further configured to scale magnitudes of a plurality of second complex symbol samples of said OFDM signal which immediately precede or succeed said first complex symbol sample.

16. The system according to claim 15, wherein said magnitudes of said first and second complex symbol samples are scaled by different amounts so as to prevent large instantaneous amplitude changes of said OFDM signal.

17. A system, comprising:
at least one electronic circuit configured to:
- route an OFDM signal to first and second signal processing paths;
- time delay said OFDM signal traveling along said first signal processing path;
- determine whether an instantaneous signal magnitude value of said OFDM signal traveling along said second signal processing path is greater than a threshold value;
- if it is determined that said instantaneous signal magnitude value is greater than said threshold value, scale a magnitude of at least a first complex symbol sample of said OFDM signal which has been time delayed to a level that precludes a power amplifier from entering a non-linear region of operation; and
- if it is determined that said instantaneous signal magnitude value is not greater than said threshold value, output said complex symbol sample of said OFDM signal which has been time delayed without modification to said magnitude thereof;

wherein said electronic circuit is further configured to determine said threshold value by:
- calculating a power value using said instantaneous signal magnitude value;
- computing an average signal power value using said power value;
- multiplying a maximum PAPR by said average signal power value to yield an allowed peak power; and
- calculating a square root of said allowed peak power to obtain a maximum allowable signal magnitude, where said maximum allowable signal magnitude comprises said threshold value.

18. The system according to claim 17, wherein said average signal power value is computed using a digital filter.

19. The system according to claim 18, wherein said determination as to whether said instantaneous signal magnitude value is greater than said threshold value is made exclusively when said digital filter has a steady state behavior.

20. A system, comprising:
at least one electronic circuit configured to:
- route an OFDM signal to first and second signal processing paths;
- time delay said OFDM signal traveling along said first signal processing path;
- determine whether an instantaneous signal magnitude value of said OFDM signal traveling along said second signal processing path is greater than a threshold value;
- if it is determined that said instantaneous signal magnitude value is greater than said threshold value, scale a magnitude of at least a first complex symbol sample of said OFDM signal which has been time delayed to a level that precludes a power amplifier from entering a non-linear region of operation; and
- if it is determined that said instantaneous signal magnitude value is not greater than said threshold value, output said complex symbol sample of said OFDM signal which has been time delayed without modification to said magnitude thereof;

wherein said electronic circuit is further configured to determine said threshold value by:
- computing an average signal magnitude using said instantaneous signal magnitude value;
- multiplying said average signal magnitude by a maximum magnitude ratio to yield an allowable peak magnitude, where said allowable peak magnitude comprises said threshold value.

* * * * *